May 12, 1964     L. R. PATTERSON ETAL     3,132,876

WALKING BEAM SPLIT TANDEM AXLE ASSEMBLY

Filed April 2, 1962     2 Sheets-Sheet 1

Lee R. Patterson
Carlos W. Patterson

INVENTORS

BY *[signatures]*

Attorneys

May 12, 1964   L. R. PATTERSON ETAL   3,132,876
WALKING BEAM SPLIT TANDEM AXLE ASSEMBLY
Filed April 2, 1962   2 Sheets-Sheet 2

Lee R. Patterson
Carlos W. Patterson
INVENTORS

United States Patent Office 3,132,876
Patented May 12, 1964

3,132,876
WALKING BEAM SPLIT TANDEM AXLE
ASSEMBLY
Lee R. Patterson and Carlos W. Patterson, Victoria, Tex.
Filed Apr. 2, 1962, Ser. No. 184,266
5 Claims. (Cl. 280—104.5)

This invention relates to a novel and useful walking beam split tandem axle assembly and more specifically to a tandem axle assembly which has been primarily designed to provide an efficient means of spring supporting wheels from the frame of trailers adapted to be towed behind vehicles.

While the walking beam split tandem axle assembly of the instant invention may also be used as a suspension assembly for the support wheels of the trailer components of heavy highway tractor and semi-trailer combinations, because of its construction and simplicity of design the axle assembly of the instant invention is particularly well adapted to be used in conjunction with trailers somewhat smaller and lighter than semi-trailers.

The walking beam split tandem axle assembly of the instant invention has as its primary object to provide an efficient walking beam tandem axle assembly which may be readily constructed at a low cost and which may be utilized as a suspension assembly for a trailer designed to carry even the heaviest of loads.

A further object of this invention, in accordance with the immediately preceding object, is to provide an axle assembly that readily adapts itself for use in conjunction with trailer frames fabricated from readily available components such as angle and channel members.

A still further object of this invention is to provide a tandem axle assembly which may be readily marketed in kit form.

A final object to be specifically enumerated herein is to provide a walking beam split tandem axle assembly in accordance with the preceding objects which will conform to conventional forms of manufacture, be of simple construction and easy to assemble from kit form so as to provide a device that will be economically feasible, long lasting and available at a low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Referring now more specifically to the drawings the numeral 10 generally designates a trailer main frame which includes a pair of opposite side longitudinal members 12 and 14 interconnected by means of a transverse member 16.

Figure 2:
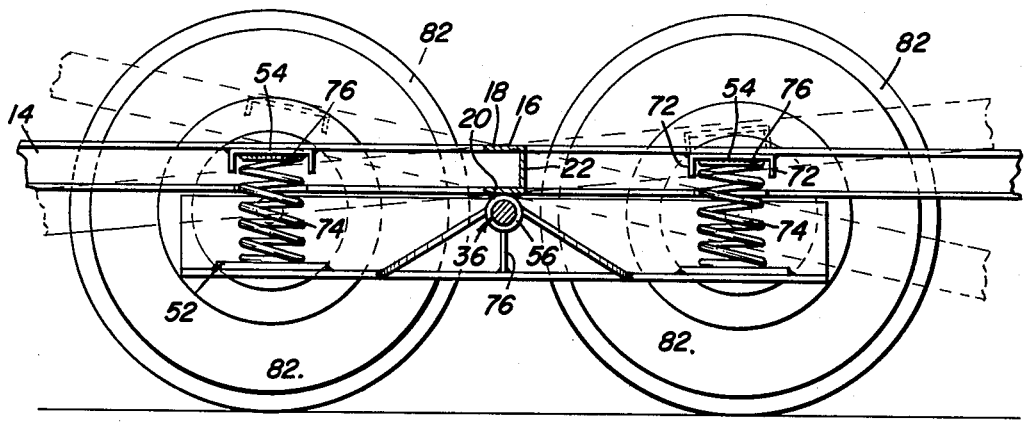
FIGURE 2 is an enlarged fragmentary vertical sectional view taken substantially upon the plane indicated by the section line 2—2 of FIGURE 1 and with alternate positions of the axle assembly shown in phantom lines.
Figure 3:
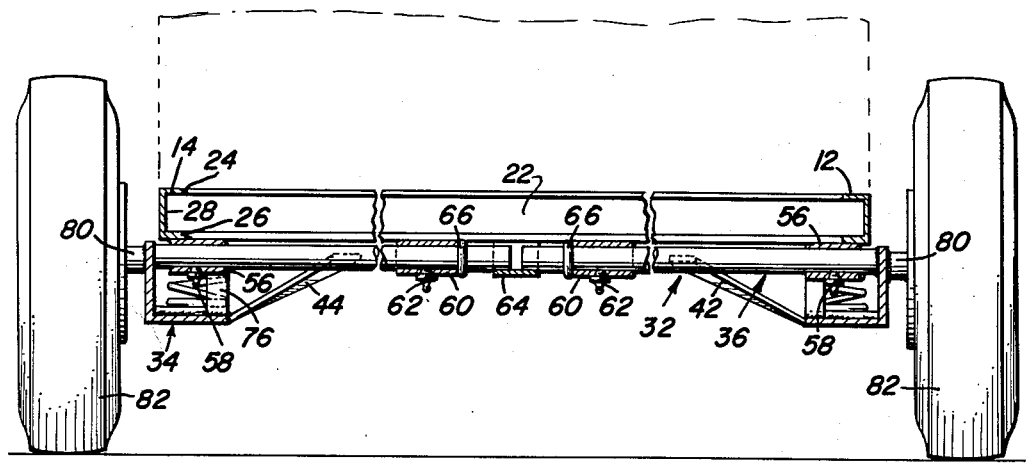
FIGURE 3 is a transverse vertical sectional view taken substantially upon the plane indicated by the section line 3—3 of FIGURE 1 and with parts thereof being broken away.
Figure 4:
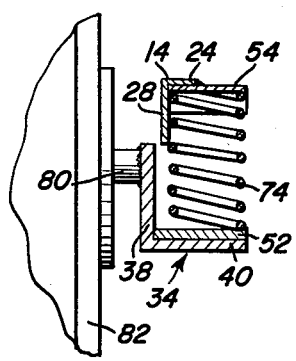
FIGURE 4 is an enlarged fragmentary transverse vertical sectional view showing the manner in which the walking beam ends of the axle assembly are spring-supported from the frame of the trailer.

As can best be seen from FIGURES 2 and 3 of the drawings the transverse member 16 comprises a channel member including a pair of legs 18 and 20 interconnected by means of an upstanding bight portion 22 while each of the longitudinal members 12 and 14 are similarly formed and each includes a pair of legs 24 and 26 interconnected by means of an upstanding bight member 28.

It is of course to be understood that the opposite ends of the longitudinal side members 12 and 14 will also be interconnected by means of suitable transverse members (not shown).

Figure 1:
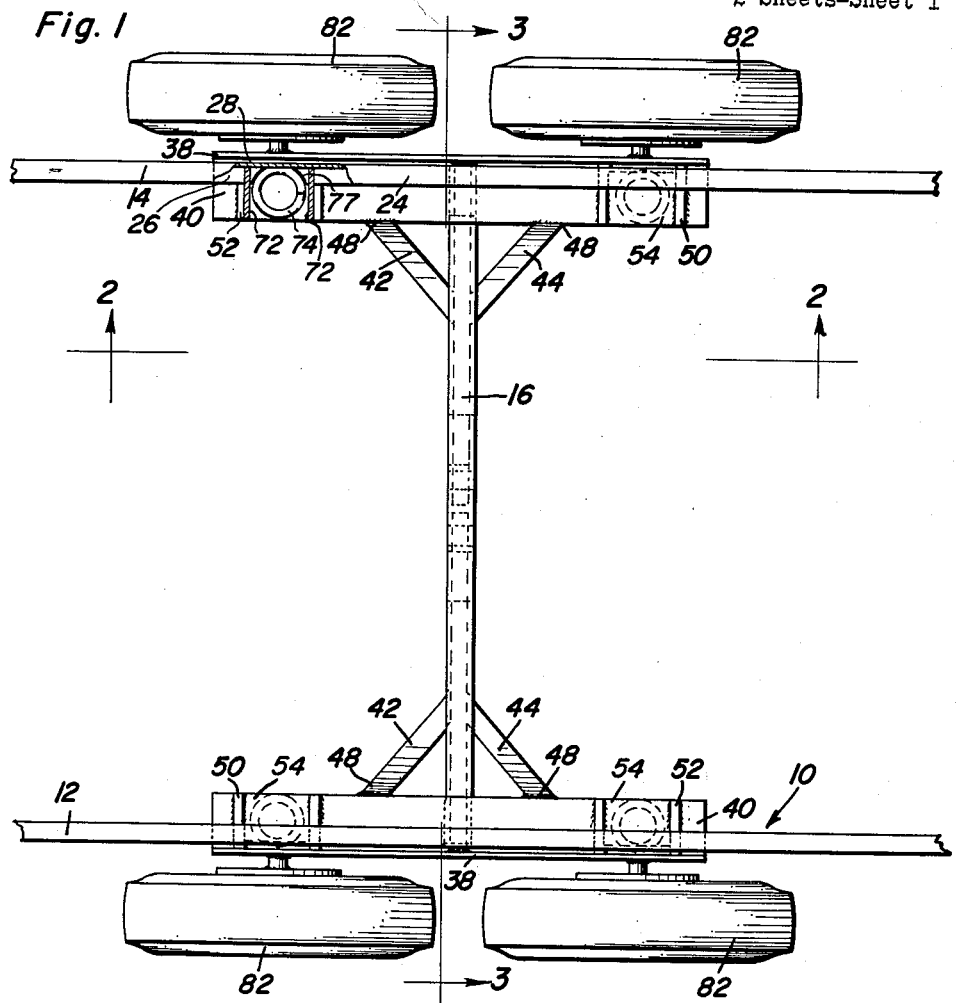
FIGURE 1 is a fragmentary top plan view of a trailer frame shown with the walking beam split tandem axle assembly of the instant invention mounted thereon and with portions of the trailer frame broken away and shown in horizontal section to more clearly illustrate the structural details thereof.
Figure 5:
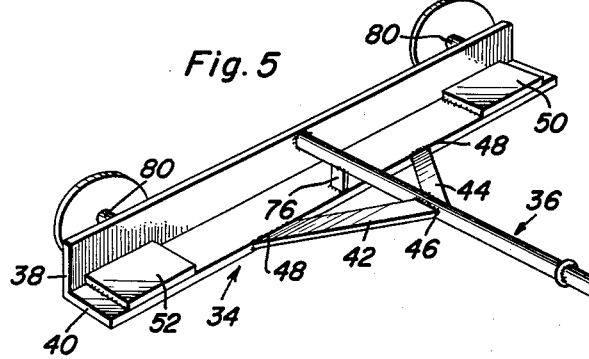
FIGURE 5 is a perspective view of one walking beam and stub axle member of the axle assembly.

With attention now directed to FIGURES 3 and 5 of the drawings it will be seen that the walking beam split tandem axle assembly of the instant invention is generally designated by the reference numeral 32 and that it includes a pair of walking beams each generally designated by the reference numeral 34 and a pair of stub axle members each generally designated by the reference numeral 36.

Each walking beam includes an upstanding leg 38 and a horizontal leg 40 which projects inwardly from the lower marginal edge portion of the corresponding upstanding leg. The outer end of the corresponding stub axle member 36 is secured to the upper marginal edge portion of the associated upstanding leg 38 at a point spaced substantially equidistant from the opposite ends of that upstanding leg 38. In addition, a pair of diagonal brace members 42 and 44 are secured between each stub axle member 36 and the corresponding walking beam 34. The diagonal brace members 42 and 44 are connected at corresponding ends to opposite sides of the associated stub axle member 36 in any convenient manner such as by welding 46 and the other pair of ends of each pair of diagonal bracing members 42 and 44 are secured to the innermost marginal edge portions of the corresponding horizontal leg 40 at points spaced on opposite sides of the outer ends of the corresponding stub axle member 36 in any convenient manner such as by welding 48.

In addition, it may be seen from the drawings that a pair of spring seat plates 50 and 52 are secured to the opposite ends of each of the horizontal legs 40. Further, each of the side members 12 and 14 has secured to the upper leg 24 thereof an upper spring seat plate 54.

With attention now directed to FIGURE 3 of the drawings it will be seen that a pair of sleeve members 56 are secured to the under surface of the opposite ends of the transverse member 16 and are provided with Zerk fittings 58. In addition, a second pair of sleeve members 60 are secured to the under surface of the transverse member 16 adjacent the mid-portion thereof in any convenient manner and are each provided with Zerk fittings 62. Finally, a center sleeve member 64 is secured to the center of the transverse member 16. Each of the stub axle members 36 is rotatably journalled at three points there along by means of the corresponding sleeves 56 and 60 and the center sleeve 64. The Zerk fittings 62 and 58 are of course to provide a means for lubricating the sleeve members 56 and 60 and from FIGURES 3 and 5 of the drawings it will be seen that the free end portion of each stub axle member 36 has a radially outwardly projecting and circumferentially extending shoulder 66 formed thereon. The shoulders 66 abut against the confronting ends of the sleeve members 60 and prevent axial outward retraction of the stub axle members 36.

From FIGURE 2 of the drawings it may be seen that each of the upper spring seat plates 54 includes a pair of depending legs 72 and that the uppermost convolution of a coil spring 74 is secured to each spring seat plate 56 in any convenient manner such as by welding 76, a pair of notches 77 being formed in each leg 26 adjacent the opposite ends thereof providing clearance for the associated spring 74.

The lower ends of the springs 74 are merely disposed in frictional engagement with the lower spring seat plates 52 and need not in any way be fixedly secured thereto. However, if it is desired, a vertical brace member 76 may be secured between the portion of each stub axle member 36 disposed immediately inwardly of the corresponding upstanding leg 38 and the corresponding horizontal leg 40 of the associated walking beam 34.

Each of the upstanding legs 38 has a pair of spindles 80 secured to its opposite end portions which project outwardly of that upstanding plate or leg. A ground-engaging wheel 82 is journalled on the free end of each spindle 80 and it will thus be seen that each walking beam 34 is utilized to rotatably support a pair of wheels 82 and also that each walking beam 34 may be oscillated about its axis of rotation defined by the corresponding stub axle member 36 independently of the other walking beam 34.

Inasmuch as the springs 74 of each walking beam 34 are both axially compressed when the beam 34 generally parallels the corresponding side frame member, the springs 74 will normally resiliently urge the walking beam 34 to a center position generally paralleling the corresponding main frame side member.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a vehicle including a main frame having opposite side longitudinal members interconnected by means of a transverse member, a tandem axle suspension assembly comprising a pair of laterally spaced walking beams each having one end of a stub axle member secured thereto intermediate its opposite end and projecting laterally outwardly therefrom, said stub axle members projecting toward each other and being substantially axially aligned, means carried by said transverse member journalling said stub axle members for independent rotation about their longitudinal axes, said walking beams generally paralleling said longitudinal members, and spring means disposed between the opposite end portions of each of said walking beams and corresponding portions of the corresponding side longitudinal members normally resiliently urging said walking beams toward rest positions substantially paralleling said longitudinal members, and ground-engaging support wheels rotatably supported from the opposite end portions of each of said walking beams, a pair of diagonal brace members for each of said stub axle members, each pair of brace members secured at one pair of ends to opposite sides of the corresponding stub axle member at a point spaced from the associated beam and at the other pair of ends to the associated beam at points spaced on opposite sides of its connection with the corresponding stub axle member, each pair of diagonal brace members also being disposed in a plane inclined relative to the longitudinal axis of the corresponding stub axle member, whereby a tripod connection between each of said stub axle members and the corresponding beam is formed, each of said opposite end portions of said beams including an outwardly projecting spindle portion, said wheels each being rotatably supported from a corresponding one of said spindles.

2. The combination of claim 1, wherein each of said beams comprises an elongated substantially L-shaped channel member with its lower horizontal leg projecting inwardly toward the center of said frame from the lower end of its upstanding leg, said other pair of ends of said diagonal brace members being secured to the corresponding horizontal legs.

3. The combination of claim 1, wherein the spindle portions carried by each beam are secured to one longitudinal marginal edge portion of the corresponding upstanding leg, each of said stub axle members also being secured to said one longitudinal marginal edge portion of the corresponding upstanding leg, and a vertical brace member secured between the outer end portion of each stub axle and the corresponding horizontal leg a spaced distance inwardly of the associated upstanding leg.

4. The combination of claim 1, wherein said opposite end portions of said beams are provided with spring seats opposing spring seats carried by the corresponding longitudinal member of said main frame, coil spring means disposed between corresponding pairs of said spring seats.

5. The combination of claim 1, wherein said journalling means includes a plurality of sleeve members secured to said transverse member and rotatably receiving said stub axle members at points spaced longitudinally therealong one of said sleeve members rotatably receiving the adjacent ends of both of said axle members, said adjacent ends being at least slightly spaced apart.

References Cited in the file of this patent

UNITED STATES PATENTS

| 2,052,064 | Whisenand | Aug. 25, 1936 |
| 2,260,574 | Martin | Oct. 28, 1941 |
| 2,488,002 | Carraher | Nov. 15, 1949 |

FOREIGN PATENTS

| 565,344 | Canada | Oct. 28, 1958 |
| 1,007,672 | France | Feb. 13, 1952 |